(12) United States Patent
Kunert

(10) Patent No.: US 11,027,585 B2
(45) Date of Patent: Jun. 8, 2021

(54) LINK FOR A LINK SYSTEM FOR THE ATTACHMENT OF A WHEEL CARRIER TO A BODY OF A VEHICLE

(71) Applicant: Dr. Ing. h.c. F. Porsche Aktiengesellschaft, Stuttgart (DE)

(72) Inventor: Micha Kunert, Weissach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 64 days.

(21) Appl. No.: 16/576,007

(22) Filed: Sep. 19, 2019

(65) Prior Publication Data
US 2020/0130443 A1    Apr. 30, 2020

(30) Foreign Application Priority Data
Oct. 26, 2018    (DE) .......................... 102018126732.0

(51) Int. Cl.
*B60G 3/06* (2006.01)
*B60G 7/00* (2006.01)
*B62D 21/11* (2006.01)

(52) U.S. Cl.
CPC ............... *B60G 3/06* (2013.01); *B60G 7/001* (2013.01); *B62D 21/11* (2013.01)

(58) Field of Classification Search
CPC .......... B60G 3/06; B60G 7/001; B60G 7/002; B60G 7/008; B60G 2204/129; B60G 2206/08; B60G 2208/10; B60G 2206/11
USPC .................................................. 280/124.134
See application file for complete search history.

(56) References Cited

U.S. PATENT DOCUMENTS

| | | | | |
|---|---|---|---|---|
| 3,007,713 A * | 11/1961 | Schilberg | ................ | B60G 5/02 280/680 |
| 6,113,058 A * | 9/2000 | Iwasaki | ................ | B60G 7/001 248/678 |
| 6,913,273 B2 * | 7/2005 | Drabon | ................ | B60G 7/001 280/124.134 |
| 8,196,940 B2 * | 6/2012 | Jeong | ................ | B29C 45/14778 280/93.51 |
| 10,202,012 B2 * | 2/2019 | Narita | ................ | B21D 53/88 |

(Continued)

FOREIGN PATENT DOCUMENTS

| | | | | |
|---|---|---|---|---|
| DE | 102016207633 A1 * | 12/2016 | ............. | B60G 7/008 |
| JP | 2000081006 A * | 3/2000 | | |

OTHER PUBLICATIONS

Nakamura, Link Member Made of Aluminum Alloy, Mar. 21, 2000, EPO, JP 2000081006 A, Machine Translation of Description (Year: 2000).*

(Continued)

*Primary Examiner* — Paul N Dickson
*Assistant Examiner* — Matthew D Lee
(74) *Attorney, Agent, or Firm* — RatnerPrestia

(57) ABSTRACT

A link for a link system for the attachment of a wheel carrier to a body of a vehicle, having a main body with a joint portion with a joint bearing receptacle for the articulated fastening to the body of the vehicle, a wheel carrier portion with a wheel carrier joint receptacle for the articulated fastening to a wheel carrier of the vehicle, and a connecting portion between the wheel carrier portion and the joint portion. In the joint portion, centers of area of the main body form a center of gravity line which is oriented centrally with respect to the longitudinal axis of the main body.

15 Claims, 3 Drawing Sheets

(56) References Cited

U.S. PATENT DOCUMENTS 10,780,755 B2 * 9/2020 Pavesio ................. B60G 7/001
2002/0150747 A1 * 10/2002 Wellman ............... B29C 70/347
428/293.7

OTHER PUBLICATIONS

Fukumori, Rods, Dec. 1, 2016, EPO, DE 102016207633 A1, Machine Translation of Description (Year: 2016).*

* cited by examiner

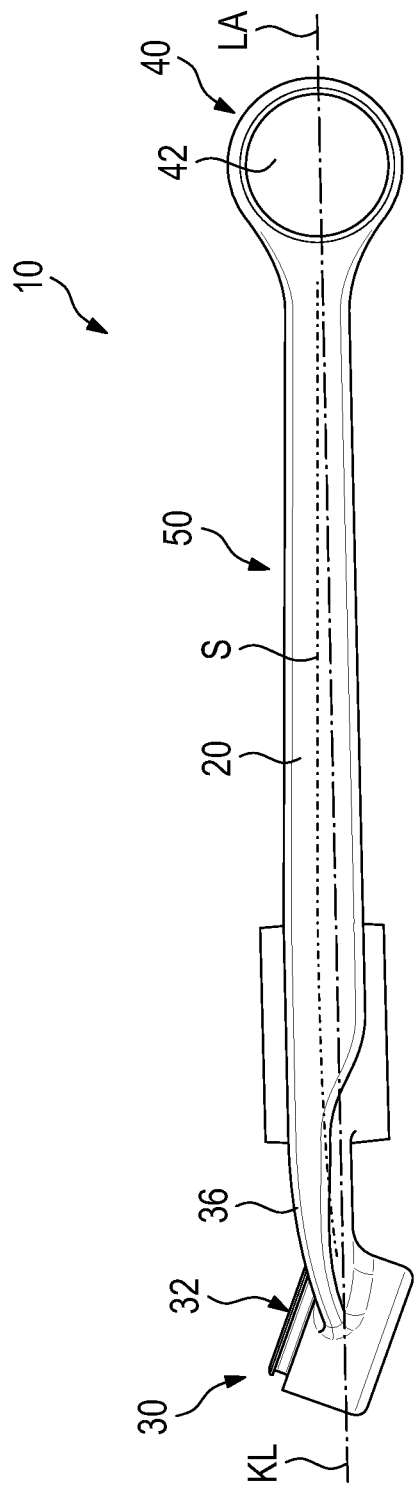
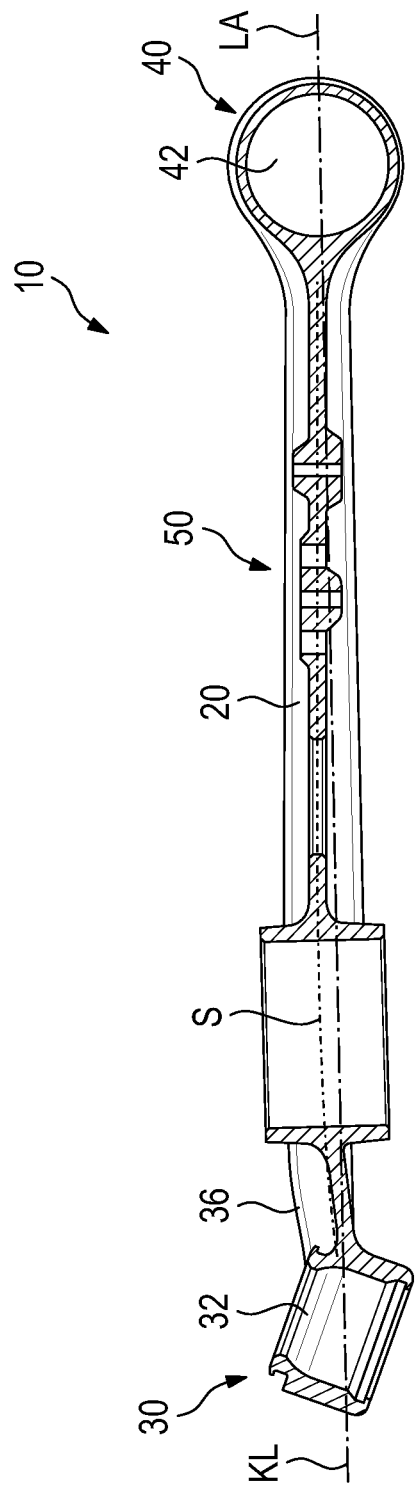

LINK FOR A LINK SYSTEM FOR THE ATTACHMENT OF A WHEEL CARRIER TO A BODY OF A VEHICLE

CROSS-REFERENCE TO RELATED APPLICATION

This application claims priority to German Patent Application No. 10 2018 126 732.0, filed Oct. 26, 2018, the content of such application being incorporated by reference herein in its entirety.

FIELD OF THE INVENTION

The present invention relates to a link for a link system for the attachment of a wheel carrier to a body of a vehicle, and to a link system for an attachment of a wheel carrier to a body of a vehicle.

BACKGROUND OF THE INVENTION

It is known for link systems to be used to connect wheel carriers to the body of the vehicle. Such link systems may be composed of individual, in particular multiple, different individual links in order to be able to provide the desired freedom of movement for a spring-damper combination but also for articulated axles on the wheel carrier. For this freedom of movement, the links are each equipped with bearing receptacles in order to be articulatedly fastened to the wheel carrier at one end of the link and to the body at the other end. It is the main object of the known links to be able to receive the forces that act during the movement of the vehicle from the wheel carrier and transmit said forces onward to the body, and vice versa.

It is a disadvantage in the case of the known solutions that, for the mechanical stability, the links must be of very solid design. This is in particular owing to the fact that, in the region of the joint bearing receptacle, a joint tilt is commonly necessary in order to be able to accommodate the desired geometrical relationships on the wheel carrier, on the link and on the body. This joint tilt furthermore makes it necessary to maintain a corresponding free access space in order to also be able to install the link in the desired manner. To ensure this, a very solid design of the link in said joint portion is necessary, which is normally provided as a so-called S bend. To prevent undesired bending or deformation in the region of the joint portion, it is necessary here to work with solid material in order to be able to ensure adequate mechanical stability. Aside from the high material usage, this leads to an increased space requirement and increased weight of the respective link.

SUMMARY OF THE INVENTION

Described herein is a link for a link system that is stable and at the same time as lightweight as possible in as inexpensive and simple a manner as possible.

Further features and details of the invention will emerge from the claims, the description and the drawings. Features and details which are described in conjunction with the link according to aspects of the invention self-evidently also apply in conjunction with the link system according to aspects of the invention and vice versa in each case, and therefore reference is or can be made constantly from one to the other in respect of the disclosure of the individual aspects of the invention.

A link according to aspects of the invention for a link system serves for the attachment of a wheel carrier to a body of a vehicle. For this purpose, the link has a main body with a joint portion with a joint bearing receptacle for the articulated fastening to the body. The main body is furthermore equipped with a wheel carrier portion with a wheel carrier joint receptacle for the articulated fastening to a wheel carrier of the vehicle. For the connection between the joint portion and the wheel carrier portion, a connecting portion is provided between the wheel carrier portion and the joint portion. In the joint portion, the centers of area of the main body form a center of gravity line which is oriented centrally with respect to the longitudinal axis of the main body. Said central center of area, or the profile along a center of gravity line of all centers of area of the main body in the joint portion centrally with respect to the respective longitudinal axis, yields a multiplicity of advantages. Firstly, the central orientation will lead to a symmetrical force distribution in the main body. What is particularly advantageous, however, is the high component stiffness that is made possible here with a low weight. Irrespective of the actual geometrical design in the region of the joint portion, the central arrangement of the center of gravity line in particular at the same or substantially the same height as, and thus in part coaxially with, the longitudinal axis of the main body will have the effect that the introduction of force occurs without a lever arm, or with only a small lever arm, between the center of gravity line and the longitudinal axis. It is thus ensured that no bending moments or only very low bending moments are introduced into the joint portion in this region, such that a simple and stable transmission of the introduced bending moment via the link or the main body is made possible.

According to aspects of the invention, a center of area is to be understood to mean the respective center of gravity of the main body in the respective cross-sectional area. If one follows the individual cross sections through the main body, each of these individual cross sections has its own unique center of area. The connection of all of these centers of area of all of the cross sections of the main body collectively yields a line, which is to be understood in the context of the present invention as center of gravity line. Said center of gravity line may be of straight configuration, though may also have a curved or kinked form. The configuration of the center of gravity line is directly related to the cross-sectional profile of the main body and the associated profile of the centers of area.

The central relationship, or the central orientation, of the center of gravity line with respect to the longitudinal axis is to be equated in particular with a coaxial configuration, in the joint portion, with the longitudinal axis for the center of gravity line. This has the effect that no additional bending moment whatsoever is introduced into the main body in this region of the joint portion, it being the case that introduced forces are transmitted, via the longitudinal axis which is preferably also simultaneously the force action line, via the main body to the wheel carrier portion.

As is evident from the explanation above, it is now possible, through skillful selection of the center of area or of the corresponding cross sections in the joint portion, for the center of gravity line to be oriented with the longitudinal axis. In the case of substantially free or at least partially compensating configuration of the respective cross section in the main body, this has the effect that, even in the case of complex geometries, such as for example a joint tilt, or else in the case of correspondingly required installation free spaces, a very stable and simultaneously lightweight construction of the main body is nevertheless made possible.

The freedom in the geometrical configuration of the joint portion has an effect here only to a limited extent through the corresponding selection of the corresponding cross sections of the main body in order, in the manner according to aspects of the invention, to orient the center of gravity line centrally along the longitudinal axis of the main body. Examples of such configurations will be discussed below.

It may be advantageous if, in the case of a link according to aspects of the invention, a hollow-like depression is at least partially surrounded by lateral elevations. Such a hollow-like depression is of substantially U-shaped appearance in cross section, such that the depression in this U is a hollow-like depression surrounded with the corresponding side limbs of the U and thus lateral elevations. This leads to a particularly simple and inexpensive configuration for ensuring the orientation according to aspects of the invention of the center of gravity line centrally with respect to the longitudinal axis of the main body. The hollow-like depression now makes it possible, even in the case of a joint tilt, to simply and easily access the corresponding joint bearing receptacle for installation purposes. Since, by means of this hollow-like depression, the corresponding center of area would however move considerably lower, this is compensated by means of lateral elevation with additional material. The hollow-like depression is thus maintained and leaves accessibility unaffected, whereas, however, by means of the lateral elevations, the center of area is raised again and can, in accordance with the present invention, be oriented centrally with respect to the longitudinal axis of the main body.

A further advantage can be achieved if, in the case of a link according to aspects of the invention, the joint portion, the connecting portion and/or the wheel carrier portion are formed symmetrically or substantially symmetrically with respect to the longitudinal axis of the main body. It is preferable if at least the joint portion and wheel carrier portion are of correspondingly symmetrical form. This has the effect that lateral bending moments, that is to say a breakaway of the link or of the main body to the left or to the right under load, is avoided, or the likelihood of this is at least reduced. Here, the center of gravity line advantageously extends along a force action line or in a perpendicular plane together with the longitudinal axis and/or the force action line. Here, the symmetry applies in particular also to the lateral elevations as have been discussed in the preceding paragraph with regard to a hollow-like depression.

It is likewise advantageous if, in the case of a link according to aspects of the invention, the joint portion is of bending-free or substantially bending-free form. This makes it possible for bending moments in this region of the joint portion to be reduced or substantially reduced. Here, the force accommodated in the joint portion is introduced preferably along the longitudinal axis, and thus in particular also along a force action line, into the main body, such that no corresponding height offset arises either laterally or transversely. In the case of high levels of force transmission being applied, this has the effect that the lowest mechanical load prevails in this region, such that a mechanical defect, in particular a predefined mechanical defect, occurs not in this region but rather for example in the connecting portion, as will be discussed further below with regard to the defined failure situation.

Further advantages can be achieved if, in the case of a link according to aspects of the invention, the center of gravity line is, in the joint portion, arranged on or substantially on a force action line between the joint portion and the wheel carrier portion. Here, the center of gravity line runs preferably coaxially with said force action line, which is in particular oriented coaxially with the longitudinal axis of the main body. This is a particularly simple and inexpensive configuration for the described freedom from bending according to the preceding paragraph. As will likewise be discussed in more detail further below, the same preferably also applies to the wheel carrier portion.

It is likewise advantageous if, in the case of a link according to aspects of the invention, the center of gravity line has, in the connecting portion, a spacing, in particular in a vertical direction, with respect to a force action line between the joint portion and the wheel carrier portion. In other words, the connecting portion is explicitly of contrary form with respect to the joint portion, specifically is not of bending-free form, but rather is equipped with a bending lever for a defined bending moment with respect to the force action line. Such a defined bending moment is set in predefined fashion by means of a defined lever arm, specifically the offset or the spacing between center of gravity line and force action line. It may be desirable, in the event of overloading of the link, for this overloading to be visually indicated at a defined position. This visual indication is normally realized by means of plastic deformation in the defined region, in this case in the connecting portion. Since this defined plastic deformation for a defined failure situation should however take place only proceeding from a defined overload situation, it is now easily and inexpensively possible, through the setting of the spacing between the center of gravity line and the force action line, for the predefinition and thus the triggering threshold for said defined failure situation to be predetermined and structurally configured.

Further advantages can be achieved if, in the case of a link according to aspects of the invention, the center of gravity line is, in the wheel carrier portion, arranged on or substantially on the force action line. In this way, the same advantages as have been discussed with regard to the introduction of forces into the joint portion are also achieved for the wheel carrier portion. In particular, the introduction in the wheel carrier portion also takes place, without bending, directly into the force action line, so to speak. The above-described defined failure situation thus remains entirely or substantially entirely restricted to the connecting portion.

Advantages are furthermore achieved if, in the case of a link according to aspects of the invention, the center of gravity line is, at least in the connecting portion, formed with a continuous spacing variation with respect to the force action line, in particular in a curved manner. An undesired intense step change in the bending profile is thus avoided. In particular, in this way, there is also an exact separation between a desired bending region and the adjacent joint receptacles. The avoidance of a bending profile with a step change further contributes to the stabilization or to the increased stability of the link during use.

The present invention likewise relates to a link system for the attachment of a wheel carrier to a body of a vehicle, having at least one link according to aspects of the invention. A link system according to aspects of the invention therefore yields the same advantages as have been discussed in detail with respect to a link according to aspects of the invention.

A link system according to aspects of the invention can be refined in that the at least one link is formed as a transverse link. A transverse link is advantageous for a link system according to aspects of the invention in particular because, here, it is possible to work with free joint tilts without disadvantages being encountered with regard to mechanical stability.

BRIEF DESCRIPTION OF THE DRAWINGS

Further advantages, features and details of the invention emerge from the description below in which exemplary embodiments of the invention are described in detail with reference to the drawings. The features mentioned here in the claims and in the description may be essential to the invention in each case individually by themselves or in any desired combination. Schematically in the drawings:

FIG. 2 shows the embodiment of FIG. 1 in a lateral illustration,

FIG. 3 shows the embodiments of FIGS. 1 and 2 in the lateral cross section,

DETAILED DESCRIPTION OF THE INVENTION

Figure 1:
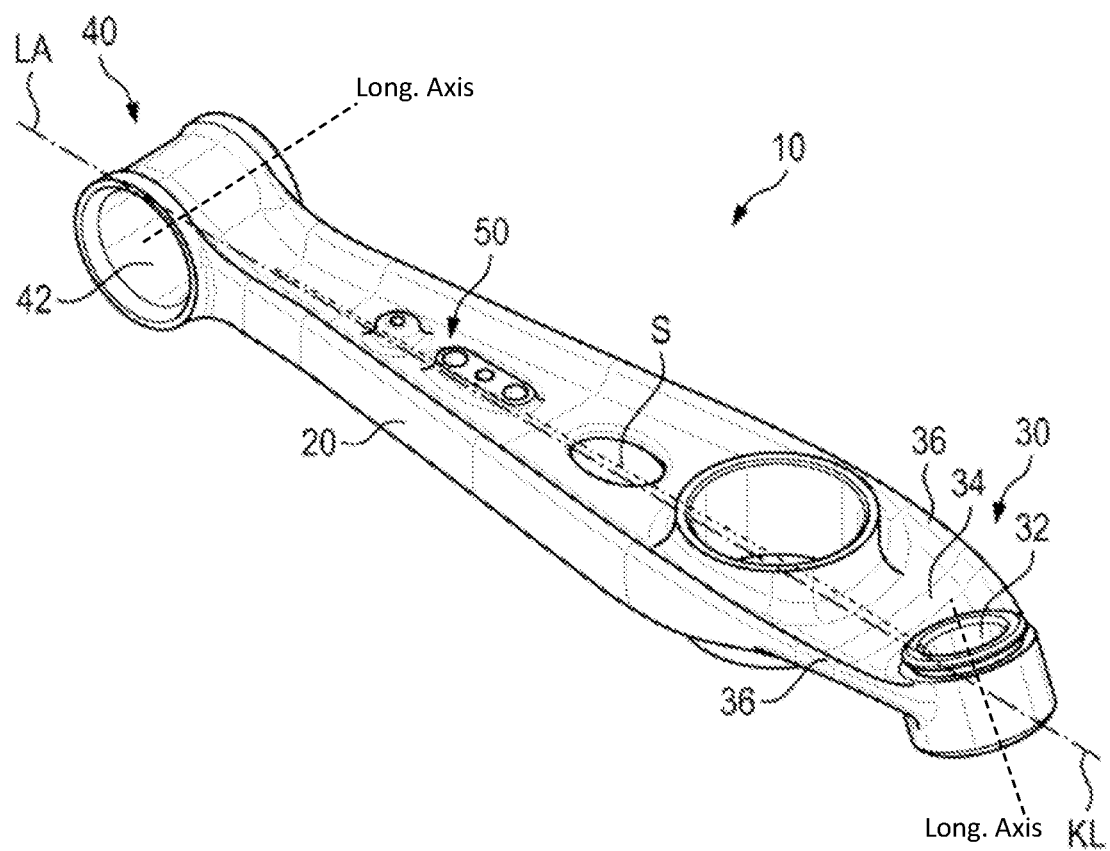
FIG. 1 shows an embodiment of a link according to aspects of the invention.

FIGS. 1 to 5 schematically illustrate a link 10 of a link system according to aspects of the invention. In the case of this configuration, the link 10 is designed as a transverse link and, for the connection between body and wheel carrier, has the corresponding portions for fastening purposes. These are firstly the wheel carrier portion 40 and secondly the joint portion 30. The joint portion 30 is equipped with a joint bearing receptacle 32, which in this case is formed with a joint tilt for an articulated fastening to the body of the vehicle. At the opposite end of the main body 20 of the link 10, the wheel carrier portion 40 is equipped with a wheel carrier joint receptacle 42. Here, the entire main body 20 extends along its longitudinal axis LA.

In order to be able to transmit the force between the joint portion 30 and the wheel carrier 40 in an effective manner, the force can be transmitted along the longitudinal axis LA, which in this case is also the force action line KL. For the desired mechanical stabilization of the link 10, which is formed here as a cast part, particular attention must be paid to the joint portion 30.

Figure 4:
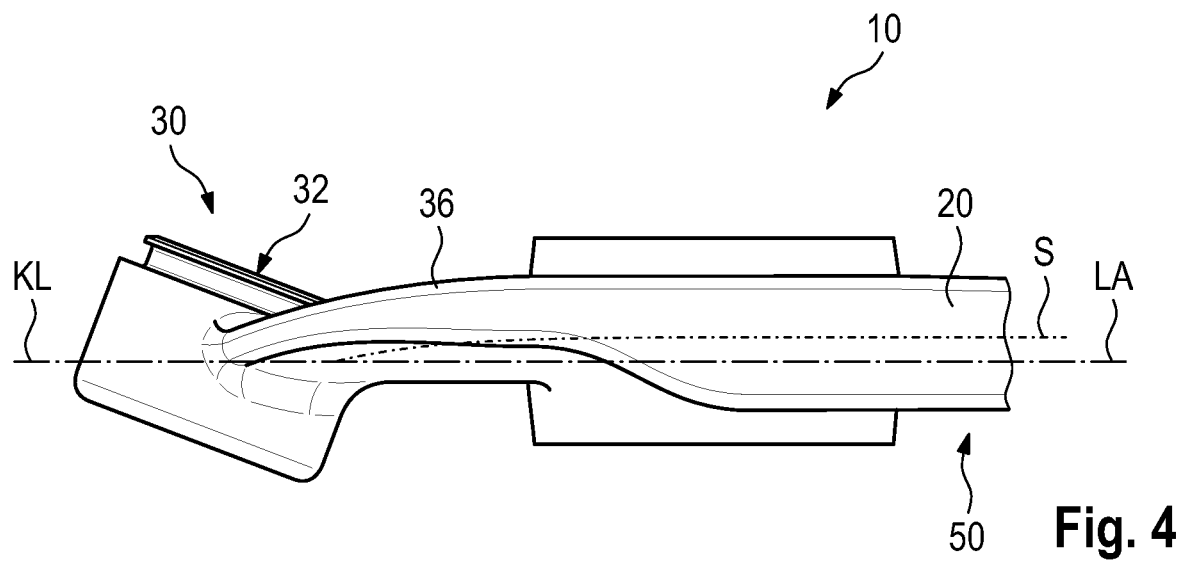
FIG. 4 shows the embodiments of FIGS. 1 to 3 in an enlarged illustration of the joint portion.

It can be clearly seen in particular in FIGS. 2, 3 and 4 that the joint portion 30 with its joint bearing receptacle 32 has a joint bearing tilt, that is to say is fastened obliquely or at an angle to the main body 20. In order to now ensure that the forces can be accommodated without bending in said region, the center of gravity line S of all centers of area of the cross sections of the main body 20 is illustrated in FIGS. 1, 2, 3, 4 and 5. The profile along the longitudinal axis LA is in this case partially spaced apart from the longitudinal axis LA and thus also spaced apart from the force action line KL.

A crucial advantage of the present invention is achieved in that the center of gravity line S makes contact with the force action line KL or the longitudinal axis LA in the region of the joint portion 30, or is oriented centrally with respect to said force action line or longitudinal axis there. This can be clearly seen in particular in FIGS. 4 and 5. The force that is introduced by the joint portion 30 is thus now accommodated in the main body 20 without bending. The transmission in the region of the wheel carrier portion 40 is likewise realized without bending by virtue of the fact that, here, the center of gravity S is likewise oriented centrally along the longitudinal axis LA and thus along the force action line KL.

In order, however, to be able to additionally generate a defined failure situation, there is, in the central connecting portion 50, a defined spacing and height offset upward between the center of gravity line S and the longitudinal axis LA and thus the force action line KL. The defined lever action set in this way leads to a defined bending moment, such that, in the event of a damage situation with elevated mechanical loading, a plastic deformation is restricted to the connecting portion 50.

Figure 5:
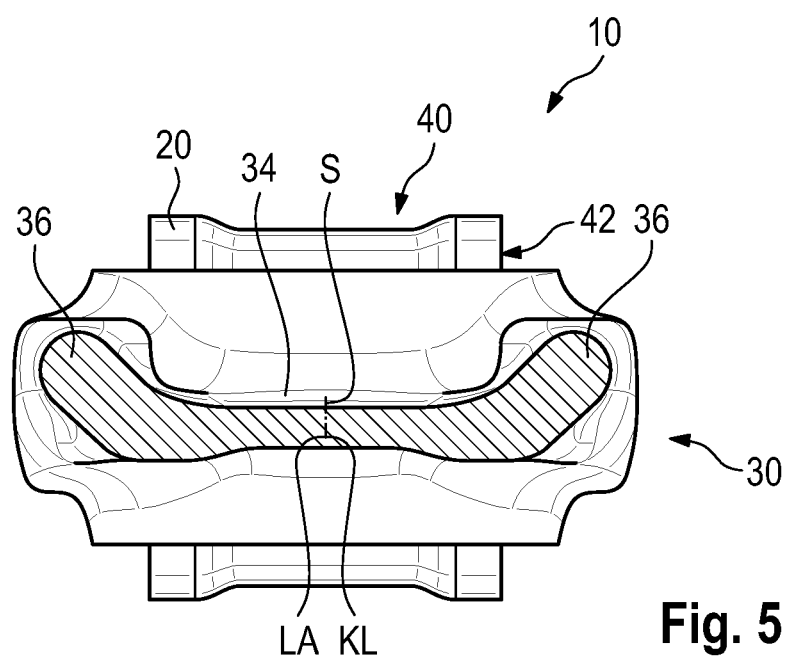
FIG. 5 shows a cross section along the longitudinal axis through the joint portion.

In FIGS. 1 and 5, it is possible in particular to clearly see the joint portion 30. In particular in FIG. 5 and the illustrated cross section, it can be seen that the central arrangement of the center of gravity line S has been generated here by means of the combination of a hollow-like depression 34 and adjacent material accumulations in the form of lateral walls or elevations 36. This is self-evidently only one possibility for the configuration according to aspects of the invention for the joint portion 30.

The above discussion of the embodiments describes the present invention exclusively within the scope of examples. Individual features of the embodiments may self-evidently be freely combined with one another, if technically expedient, without departing from the scope of the present invention.

What is claimed is:

1. A link for a link system for the attachment of a wheel carrier to a body of a vehicle, said link comprising:
    a main body including (i) a joint portion having a joint bearing receptacle for the articulated fastening to the body of the vehicle, (ii) a wheel carrier portion with a wheel carrier joint receptacle for the articulated fastening to the wheel carrier of the vehicle, and (iii) a connecting portion between the wheel carrier portion and the joint portion,
    wherein, in the joint portion of the main body, a center of gravity line (S) of the main body is oriented centrally with respect to a longitudinal axis (LA) of the main body,
    wherein a joint longitudinal axis passing through the wheel carrier joint receptacle is oriented non-parallel with respect to a joint longitudinal axis passing through the joint bearing receptacle,
    wherein an acute angle extends between the joint longitudinal axis of the joint bearing receptacle and the longitudinal axis (LA) of the main body.

2. The link as claimed in claim 1, wherein, in the joint portion, a depression is at least partially surrounded by lateral elevations.

3. The link as claimed in claim 1, wherein the joint portion, the connecting portion and/or the wheel carrier portion are formed symmetrically or substantially symmetrically with respect to the longitudinal axis (LA) of the main body.

4. The link as claimed in claim 1, wherein the joint portion is of bending-free or substantially bending-free form.

5. The link as claimed in claim 4, wherein, in the joint portion, the center of gravity line (S) is arranged either on or substantially on a force action line (KL) between the joint portion and the wheel carrier portion.

6. The link as claimed in claim 1, wherein, in the connecting portion, the center of gravity line (S) is vertically spaced from a force action line (KL) between the joint portion and the wheel carrier portion.

7. The link as claimed in claim 6, wherein, in the wheel carrier portion, the center of gravity line (S) is arranged either on or substantially on the force action line (KL).

8. The link as claimed in claim 6, wherein, at least in the connecting portion, the center of gravity line (S) is curved and spaced apart from the force action line (KL).

9. A link system for the attachment of the wheel carrier to the body of the vehicle, the link system comprising at least one of the links of claim 1.

10. The link system as claimed in claim 9, wherein the at least one link is formed as a transverse link.

11. The link as claimed in claim 1, wherein the connecting portion is curved with respect to the longitudinal axis (LA) of the main body.

12. The link as claimed in claim 1, further comprising depressions formed in opposing surfaces of the connecting portion.

13. The link as claimed in claim 1, further comprising openings formed in the main body that are not oriented parallel to either of the joint longitudinal axes.

14. The link as claimed in claim 13, wherein one of the openings has a larger diameter than the joint bearing receptacle.

15. The link as claimed in claim 13, wherein, as viewed in a cross-section taken along an axis that is orthogonal to the longitudinal axis (LA) of the main body, a thickness of the connecting portion is reduced in a central portion as compared with side portions of the connecting portion.

* * * * *